United States Patent
Doshi et al.

(10) Patent No.: US 6,301,705 B1
(45) Date of Patent: Oct. 9, 2001

(54) SYSTEM AND METHOD FOR DEFERRING EXCEPTIONS GENERATED DURING SPECULATIVE EXECUTION

(75) Inventors: Gautam B. Doshi, Sunnyvale; Peter Markstein, Woodside; Alan H. Karp; Jerome C. Huck, both of Palo Alto; Glenn T. Colon-Bonet, Fort Collins; Michael Morrison, Sunnyvale, all of CA (US)

(73) Assignee: Institute for the Development of Emerging Architectures, L.L.C., Cupertino, CA (US)

( * ) Notice: Subject to any disclaimer, the term of this patent is extended or adjusted under 35 U.S.C. 154(b) by 0 days.

(21) Appl. No.: 09/164,327

(22) Filed: Oct. 1, 1998

(51) Int. Cl.$^7$ .................................................. G06F 9/45
(52) U.S. Cl. .............................. 717/9; 712/244; 712/222; 712/208
(58) Field of Search ........................... 717/9, 4; 712/244, 712/222, 213, 218, 208, 234, 237, 239; 711/213; 714/38; 710/262

(56) References Cited

U.S. PATENT DOCUMENTS

| | | | |
|---|---|---|---|
| 5,574,928 | * | 11/1996 | White et al. ........................ 712/23 |
| 5,634,023 | * | 5/1997 | Adler et al. ........................ 712/244 |
| 5,692,169 | * | 11/1997 | Kathail et al. ...................... 712/244 |
| 5,748,936 | * | 5/1998 | Karp et al. ......................... 712/218 |
| 5,778,219 | * | 7/1998 | Amerson et al. .................... 712/244 |
| 5,799,179 | * | 8/1998 | Ebcioglu et al. .................... 712/234 |
| 5,881,280 | * | 3/1999 | Gupta et al. ........................ 712/244 |
| 5,889,984 | * | 3/1999 | Mills .................................. 712/225 |
| 5,915,117 | * | 6/1999 | Ross et al. .......................... 710/262 |

OTHER PUBLICATIONS

Chang et al., "Three Architectureal Model for Compiler–Controlled Speculative Execution," IEEE Transactions on Computers, vol. 44, Issue 4, pp. 481–494, 1995.*

Ando et al., "Unconstrained Speculative Execution with Predicated State Buffering," IEEE Proceedings, 22nd Annual Int'l Symposium on Computer Architecture, Jun. 22–24, 1995, pp. 126–137.*

* cited by examiner

Primary Examiner—Tuan Q. Dam (57) ABSTRACT

The present invention is generally directed to a system and method for supporting speculative execution of an instruction set for a central processing unit (CPU) including non-speculative and speculative instructions. In accordance with one aspect of the invention a method includes the steps of evaluating the instructions of the program to determine whether the individual instructions are speculative or non-speculative, and assessing each of the speculative instructions to determine whether it generates an exception. For each of the speculative instructions that generates an exception, the method then encode a deferred exception token (DET) into an unused register value of a register of the CPU. In accordance with another aspect of the invention, a system is provided, which system includes circuitry configured to evaluate the instructions of the instruction set to determine whether the individual instructions are speculative or non-speculative. The system further includes circuitry configured to assess each of the speculative instructions to determine whether it generates an exception. Finally, the system further includes circuitry configured to encode a deferred exception token (DET) into an unused register value of a register of the (CPU.

17 Claims, 4 Drawing Sheets

SYSTEM AND METHOD FOR DEFERRING EXCEPTIONS GENERATED DURING SPECULATIVE EXECUTION

BACKGROUND OF INVENTION

1. Field of the Invention

The present invention generally relates to computer program code optimization, and more particularly to a system and method for supporting code optimization through the deferral of exceptions generated during speculative execution.

2. Discussion of the Related Art

As is known, the performance of a computer system may be enhanced by optimizing the code of a computer program so that the computer can execute the program more quickly. One of the steps in optimizing a program is a process called scheduling. Scheduling is a process where the series of computer operations that comprise a program are organized for execution. During the scheduling process, operations of the program may be arranged, eliminated, or moved to make the program run more efficiently for a particular CPU design. Generally, there are two forms of scheduling: dynamic scheduling performed by the hardware during execution of a program, and static scheduling performed by a compiler before execution. Either of these techniques, or a combination of both, may be used to schedule operations in a computer program for processing by a computer system.

A computer program consists of a series of instructions to be carried out by a central processing unit (CPU) in the computer system. A typical program is written in a high level language and then compiled into a series of instructions compatible with the instruction set architecture of the CPU. A program, however, may also be directly written in "machine language" according to the instruction set architecture of the computer. The instruction set architecture defines the format or encoding of operations, including operators and operands in an instruction. Depending on the structure of the CPU and the scheduling techniques involved, each instruction may have one or more operations. An operation includes an operator encoded in an opcode representing functions such as add, subtract, load, store, branch, etc. Additionally, an operation identifies the operands and the results of the operation. To accomplish this, the operation typically includes a code identifying the location such as a register of an operand or operands. It is these operations that are organized for execution by the CPU using the optimization techniques.

There are different levels of optimization. One level of optimization is local optimization where code within a straight-line code fragment or "basic block" is manipulated to run more efficiently. By way of definition, a "basic block" is a contiguous set of instructions bounded by branches and/or branch targets, containing no branches or branch targets. This implies that if any instruction in a basic block is executed, then all instructions in the basic block will be executed, i.e. the instructions contained within any basic block are executed on an all-or-nothing basis. The instructions within a basic block are enabled for execution when control is passed to the basic block by an earlier branch targeting the basic block ("targeting" as used here includes both explicit targeting via a taken branch as well as implicit targeting via a not taken branch). The foregoing implies that if control is passed to a basic block, then all instructions in the basic block must be executed; if control is not passed to the basic block, then all instructions in the basic block must not be executed. The act of executing, or specifying the execution of, an instruction before control has been passed to the instruction is called "speculation." Speculation performed by the processor at program runtime is called "dynamic speculation" while speculation specified by the compiler is called "static speculation." Dynamic speculation is known in the prior art.

Two instructions are deemed "independent" when one does not require the result of the other; when one instruction does require the result of the other they are termed "dependent" instructions. Independent instructions may be executed in parallel while dependent instructions must be executed in serial fashion. Program performance is improved by identifying independent instructions and executing as many of them in parallel as possible. Experience indicates that more independent instructions can be found by searching across multiple basic blocks than can be found by searching only within individual basic blocks, however, simultaneously executing instructions from multiple basic blocks generally requires speculation. Identifying and scheduling independent instructions, and thereby increasing performance, is one of the primary tasks of compilers and processors.

The trend in compiler and processor design has been to increase the scope of the search for independent instructions in each successive generation. In prior art instruction sets, an instruction that may generate an exception cannot be speculated by the compiler since, if the instruction causes an exception, the program may erroneously generate an exception when the program should not have. This restricts the useful scope of the compiler's search for independent instructions and makes it necessary for speculation to be performed at program runtime by the processor via dynamic speculation. However, dynamic speculation entails a significant amount of hardware complexity, furthermore, the complexity increases exponentially with the number of basic blocks over which dynamic speculation is applied—this places a practical limit on the scope of dynamic speculation. By contrast, the scope over which the compiler can search for independent instructions is much larger—potentially the entire program. Furthermore, once the compiler has been designed to perform static speculation across a single basic block boundary, very little additional complexity is incurred by statically speculating across several basic block boundaries.

Examples of local optimization techniques are common subexpression elimination and constant propagation. Another level of optimization is global optimization which includes extending local optimization techniques across conditional branches in a program and further includes transformations for optimizing loops. One form of global optimization is code motion. An example of code motion is removing code from a loop that computes the same value each iteration of a loop. A third level of optimization is machine dependent optimization. Machine dependent optimization involves manipulation of code to take advantage of specific architectural attributes of the CPU. For example, if the CPU has a pipelined functional unit for executing instructions concurrently, then code can be reordered to improve pipeline performance.

To optimize a program, code may be moved above a conditional branch in a scheduling process called speculative code motion. Speculative code motion refers to the movement of an instruction above a conditional branch that controls its execution. The execution of a "speculative" instruction may be referred to as speculative or anticipatory execution because the instruction is executed before it is known whether the instruction will actually be used in the program. Speculative code motion can enhance instruction level parallelism. Because many instructions have a long latency, meaning they take several clock cycles to execute, it is advantageous to execute an instruction speculatively. They delay that an instruction would otherwise cause can be minimized by issuing the instruction in advance. Speculative code motion may also be useful in other optimizations such as redundancy elimination.

If static speculation is to be undertaken, then several problems must be solved, one of the most important of which is the handling of exceptional conditions encountered by statically speculated instructions.

Since, as noted above, exceptions on speculative instructions cannot be delivered at the time of execution of the instructions, a compiler-visible mechanism is needed to defer the delivery of the exceptions until control is passed to the basic block from which the instructions were speculated (known as the "originating basic block"). Mechanisms that perform a similar function exist in the prior art for deferring and later delivering exceptions on dynamically speculated instructions, however, by definition the mechanisms are not visible to the compiler and therefore cannot be manipulated by the compiler into playing a role in compiler-directed speculation. No known method or apparatus for deferring and later delivering exceptions on statically speculated instructions has been enabled in the prior art. Limited forms of static speculation do exist in the prior art, however: (1) the forms do not involve deferral and later recovery of exceptional conditions, and (2) the forms do not enable static speculation over the breadth and scope of the present invention.

Another example of prior art limited static speculation is the speculation of instructions that do not cause exceptions. For example, typically the compare instruction is defined such that it does not generate any exceptions. A properly designed compiler may then speculate the compare since the only side effect is the writing of a destination. In the event that control is not passed to the compare's originating basic block, the destination is simply discarded. Another example is a load instruction from an address that is known to be valid at compile time and known to remain constant during runtime, e.g. a global variable. These conditions guarantee that if any exceptions do occur, they will not be fatal and can be handled speculatively without side effects—although the handling of the speculative exceptions may reduce overall performance. Again it should be noted that the limited forms of speculation just described do not involve or allow deferral and only apply to a restricted class of instructions.

Therefore, when undertaking static speculation, there is a need in the art to enable a mechanism to defer exceptions on speculative instructions that applies to as many forms of speculation as possible. The mechanism must posses very low latency otherwise the performance of a program compiled with speculation may actually be lower than the same program compiled without speculation. The mechanism must also place minimal restrictions on the form and the construction of software in order to allow the execution of legacy software, to minimize the impact on software developers, and to maximize the range of software implementation choices. A desired characteristic of the mechanism is to allow the computer system to dynamically adapt to program behavior in order to maximize performance over the broadest possible range of software.

Other methods are also known to deal with exceptions generated during speculative execution. One conservative approach is referred to as "safe speculation." In this approach, only operations that do not generate exceptions are moved speculatively. This approach does not improve instruction level parallelism sufficiently because it precludes speculative motion of many operations. Moreover, it does not allow load operations to be executed speculatively, and therefore, does not have the benefit of hiding memory latency.

Another alternative approach is referred to as boosting. In this approach, a speculative operation is tagged with the path back to its home basic block. To defer an exception, this state information must be saved until the processor takes a different execution path or it uses the result of the operation in a non-speculative operation.

The need to save this state information is a drawback of the boosting technique. Additional memory is required to store this state information. This gives rise to a trade off between the extent to which boosting can be achieved and the additional opcode bits required to store the branch directions. The number of branches that an operation can be moved across is limited by the memory available to store the state information.

Another approach involves the use of a poison bit to defer exceptions. In this approach, the processor marks the result register of a speculative operation with a poison bit when an exception has been generated. When another speculative operation uses the result of this operation, the processor can propagate the exception by setting a poison bit in the result register of the operation. Processing of the exception is deferred until a non-speculative operation consumes the poison bit. At that point, the processor can report or process the exception.

The poison bit approach typically requires that an extra bit be added to the opcode of speculative operations in the instruction set architecture to differentiate between speculative and non-speculative operations. This is a drawback because it increases the complexity of the instruction set and requires additional memory in the register file. In addition, the poison bit must be saved when a register is spilled at a function call or context switch. It is difficult to save the poison bit because a register that holds 64 bits of data, for example, needs to be spilled to 65 bits of memory.

Yet another approach is referred to as tagging. In this approach, each operation has a tag associated with it. Typically, a tag of zero indicates that the operation is non-speculative. For speculative operations, the tag refers to memory in the processor such as a tag table that stores information about deferred exceptions. In this scheme, a commit operation is inserted at the home block of an operation to check for a deferred exception.

One problem with the tagging approach is that the amount of speculation is typically limited by the number of opcodes available for tags. When more bits are needed to encode the tags, fewer bits are available to enhance the repertoire of operations in the instruction set architecture. Another problem is the need to explicitly clear the information stored in the tag when the branch direction skips the commit operation.

Accordingly, it is desired to provide a system and method for deferring exceptions generated during speculative execution that overcomes the shortcomings of the prior art.

SUMMARY OF INVENTION

Certain objects, advantages and novel features of the invention will be set forth in part in the description that follows and in part will become apparent to those skilled in the art upon examination of the following or may be learned with the practice of the invention.

The objects and advantages of the invention may be realized and obtained by means of the instrumentalities and combinations particularly pointed out in the appended claims. To achieve the advantages and novel features, the present invention is generally directed to a system and method for supporting speculative execution of an instruction set for a central processing unit (CPU) including non-speculative and speculative instructions. In accordance with one aspect of the invention a method includes the steps of evaluating, during execution, the instructions of the instruction set to determine whether the individual instructions are speculative or non-speculative, and assessing each of the speculative instructions to determine whether it generates an exception. For each of the speculative instructions that generates an exception, the method then encodes a deferred exception token (DET) into an unused register value of a register of the CPU.

In accordance with another aspect of the invention, a system is provided, which system includes means for evaluating the instructions of the instruction set to determine whether the individual instructions are speculative or non-speculative. The system further includes means for assessing each of the speculative instructions to determine whether it generates an exception. Finally, the system further includes means, responsive to the means for accessing, for encoding a deferred exception token (DET) into an unused register value of a register of the CPU.

In accordance with the preferred embodiment of the invention, the floating point register is used to store the DET. In this regard, an unused bit sequence spanning the exponent and significand portions of the floating point register is used to encode a unique DET value.

Consistent with the inventive concepts, however, additional information pertaining to a given DET may be encoded and stored in association with the DET. In this regard, the floating point register may be used to store encoded DET values. The DET values are preferably stored in a plurality of bits typically reserved for exponent value delimiters of a floating point number. If, however, in the floating point register there exists a plurality of reserved or otherwise unused bit combinations within the exponent portion of the register, then a unique DET value may be encoded into an otherwise unused bit sequence and written into the exponent portion of the floating point register. With regard to the addition information that may be associated with certain DET values, this addition information may be encoded and written into a portion of the floating point register typically reserved for significand information. It is associated with a given DET value by being written into the same register as the DET value.

In accordance with an alternative embodiment of the present invention, but consistent with the inventive concepts and teachings, registers other than the floating point register may be used. What is significant for purposes of the invention, is that no additional bits need to be added to a given register. Instead, reserved or otherwise unused values are utilized to store encoded DET values. Further, the DET values may be encoded and stored among a plurality of registers having otherwise unused bit combinations.

A decoder may be used to identify encoded DET values for execution, recovery, or other appropriate action.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the invention above, reference will now be made in detail to the description of the invention as illustrated in the drawings. While the invention will be described in connection with these drawings, there is no intent to limit the invention to the embodiment or embodiments disclosed therein. On the contrary, the intent is to cover all alternatives, modifications and equivalents included within the spirit and scope of the invention as defined by the appended claims.

Figure 1:
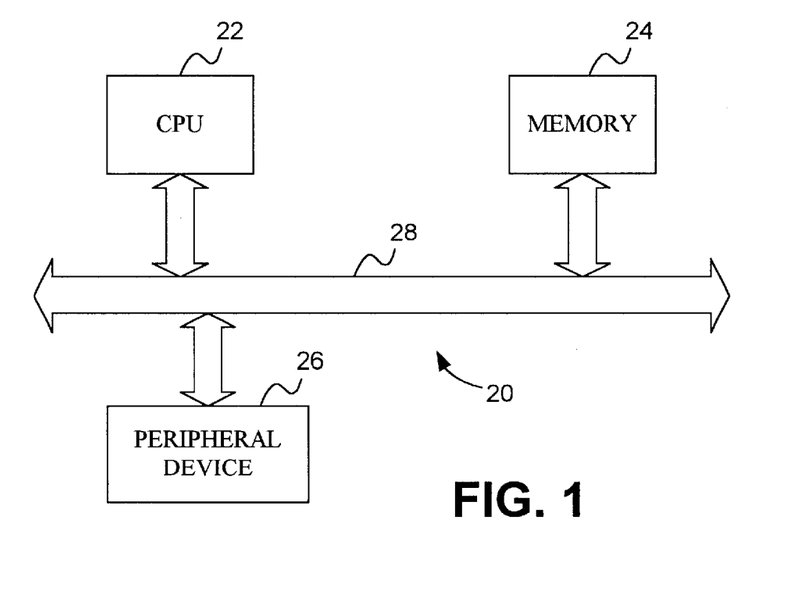
FIG. 1 is a block diagram of a computer system as is known in the prior art, and in which the present invention can be implemented.

As an overview, FIG. 1 illustrates a generalized block diagram of a computer system 20 in which an embodiment of the invention may be implemented. The computer system 20 includes a CPU 22 coupled to memory 24 and one or more peripheral devices 26 via a system bus 28. The system bus 28 carries data and control signals to the CPU 22, memory 24 and peripheral devices 26. The memory 24 preferably includes Random Access Memory (RAM), but may also be implemented with Read Only Memory (ROM), or a combination of RAM and ROM. The memory 24 stores data for one or more programs that may be executed in the computer system 20.

Figure 2:
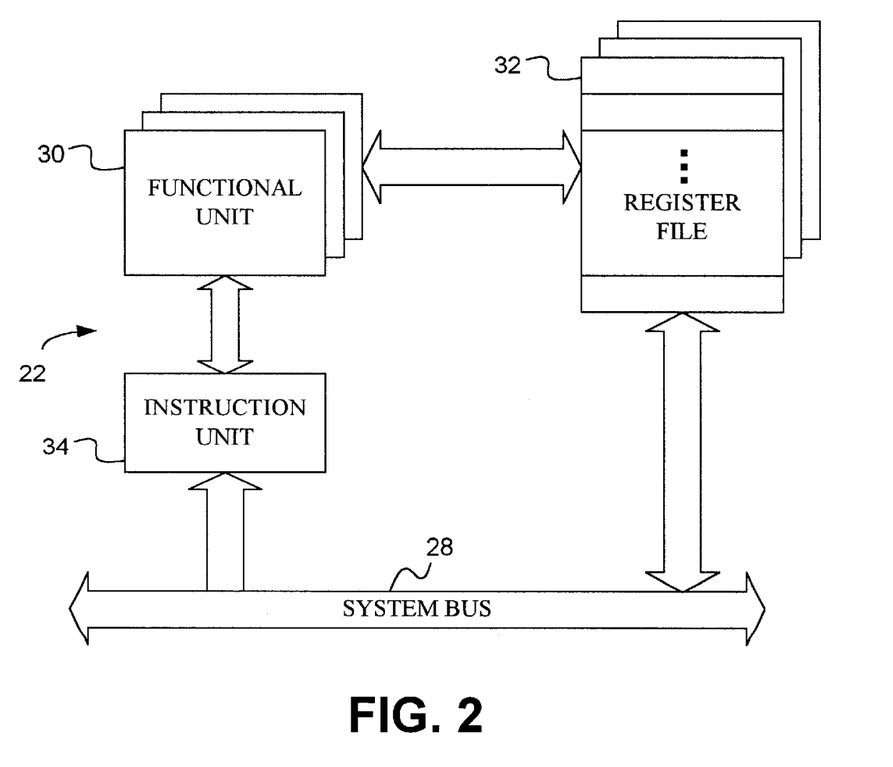
FIG. 2 is a block diagram of a processor in which the invention can be implemented.

FIG. 2 is a general block diagram of a CPU (or processor) 22 in an embodiment of the invention. The processor 22 includes multiple functional units 30, one or more register files 32, and an instruction unit 34. The register files 32 typically contain several general purpose registers 36 for storing values, addresses and possibly other data. The term "general purpose registers" can include floating point, fixed point, and predicate registers, to name a few.

As will be appreciated by those skilled in the art, the architecture of the processor 22 may vary, consistent with the concepts and teachings of the present invention. The particular illustrated architecture merely depicts the high level hardware design of a processor 22 in one possible embodiment. Speculative execution implemented according to the invention can provide performance improvement in a variety of CPU designs, including in particular CPUs with multiple functional units or CPUs with multiple pipelined functional units. In this regard, CPUs having multiple functional units are capable of parallel execution of instruction sequences. As discussed herein, a compiler for a given processor takes advantage of this parallelism when compiling code for execution on the processor 22. Part of this parallel processing includes the processing of speculative execution, and speculative execution is particularly effective in enhancing performance in Very Long Instruction Word (VLIW) computers.

In the processing of running a program, the CPU 22 carries out a series of instructions stored in memory 24. The instruction unit 34 fetches an instruction from memory via the system bus 28 and then decodes the instruction. Depending on the type of CPU and/or the scheduling method used, an instruction may have more than one operation. The instruction unit 34 issues operations to a functional unit 30 or to multiple functional units (shown as stacked boxes in FIG. 2). The instruction unit 34 sends control signals to a functional unit 30 to carry out the operation or operations in an instruction. In response to these control signals, the functional unit 30 reads data such as address or value from the appropriate registers in the register file 32 and performs an operation. For some operations, the functional unit 30 writes a result back to the register file 32. By way of example, for a memory store operation, the functional unit 30 reads a memory address and a value stored in the register file 32 and transfers the value directly to memory 24.

While the specific structure of the CPU 22 can vary, the invention provides support for speculative execution in processors that use predicates to control the execution of operations.

In accordance with the invention, one or more registers from the register file 32 are utilized to denominate "deferred exception tokens" (DETs) for speculative instructions that generate an exception. In this regard, the invention encodes otherwise unused bit sequences of one or more registers to denominate DETs. Advantageously, this avoids the addition of extra bits to registers for identifying DETs (e.g., "tagged" registers, "poison bits", etc.) as was done in prior art systems. As will be further described below, in the preferred embodiment, the floating point register is utilized to encode DETs.

By way of further discussion and clarification, instructions are divided into two classes: speculative and non-speculative. Initially all instructions are marked non-speculative. When the compiler schedules an instruction outside of the instruction's basic block, the compiler marks the instruction as speculative. Non-speculative instructions that encounter an exceptional condition generate an exception. Speculative instructions that encounter an exceptional condition do not generate an exception but rather write a DET into their destination, which is simply a note that the destination does not contain the correct result at this point. A non-speculative instruction that reads a deferred exception token generates an exception. A speculative instruction that reads a DET writes a DET into the instruction's destination (again the destination does not contain the correct result), this behavior is called "propagation." By placing a non-speculative instruction into the originating basic block of a given speculative instruction, and by configuring the non-speculative instruction to read a destination of the speculative instruction (or any location into which a DET may propagate), then a DET generated by the speculative instruction can be converted into an exception at the point at which control is passed to the originating basic block. After a DET is converted into an exception and the exceptional condition is corrected, then it is necessary to replace all previously generated DETs with correct results. This is achieved by a process called "recovery." Recovery requires the program to be augmented with additional code generated by the compiler. A system may choose not to include recovery code, e.g. to minimize program size, in which case the opportunity to defer exceptions is dramatically restricted. Since the present invention is not directed to a recovery method, this topic will not be further described herein.

It is conceivable to have every exceptional condition encountered by every speculative instruction generate an exception into the OS, and to have the OS either correct the exceptional condition (if the correction has no program visible side effects) or manually write a DET into the instruction's destination thus deferring the exception. The drawback of this approach is that generating exceptions into the OS is a high latency operation typically causing processor pipeline flushes and cache misses. In addition, the OS would be required to emulate any auxiliary operations of the instruction in software, such as address post-increment, further exacerbating overall latency. If this high latency operation were to occur on every exceptional condition on every speculative instruction the performance of a program with speculation may fall well below the performance of the same program without speculation.

A single program is typically composed of multiple "compilation units" or "modules". In many cases all modules are not compiled at the same time or by the same compiler. Further, through a process known as "dynamic linking" it is possible that certain modules are identified only during runtime and are therefore not known at compile time. The sharing of modules is a common practice in software development—e.g., libraries, and it is possible for different modules to be compiled with different degrees of recovery code—e.g., recovery for all speculative instructions, recovery for some speculative instructions, or no recovery at all.

Figure 3:
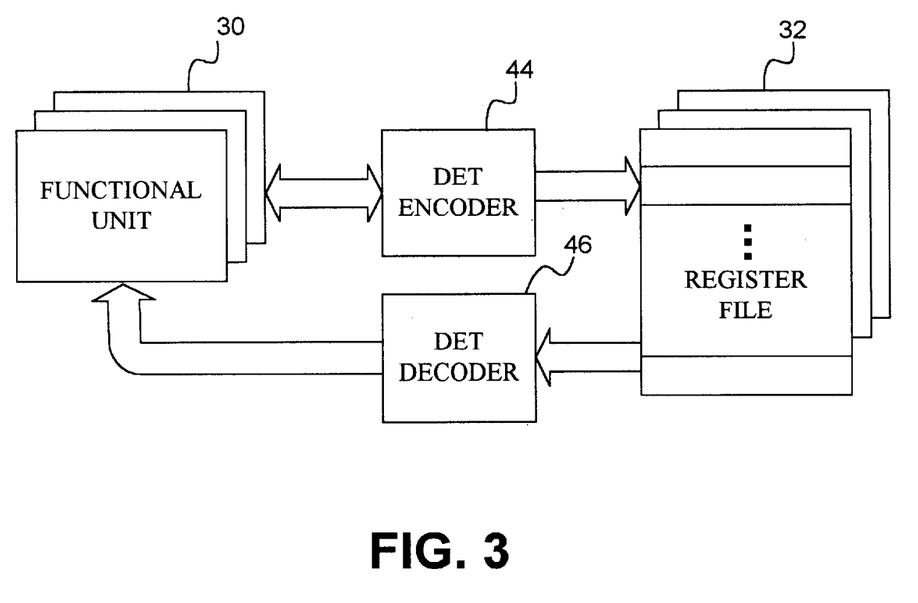
FIG. 3 is a block diagram illustrating system constructed in accordance with the present invention.

In keeping with the description of the invention, reference is made to FIG. 3, which shows a generalized block diagram of the mechanism for storing DETs. A significant aspect of the present invention is the utilization of otherwise underutilized registers to store DET values. In this regard, one or more registers of the register file 32 are underutilized insofar as they have bit sequences that are either reserved or unused. Some of these unused bit sequences are utilized by the invention, wherein the invention encodes DET values into bit sequences that correspond to the reserved or unused bit sequences of the one or more registers in the register file 32. In operation, as speculative instructions are encountered that generate exceptions, the functional units 30 pass these instructions to an encoder 44, which generates a DET value that may be stored in a register of the register file 32. A decoder 46 may then be utilized to decode DET values stored within the register file 32.

One advantage of the invention is that, by utilizing otherwise unused register values for the DET values, it eliminates the need to add addition hardware to the CPU. In this regard, the Systems of the prior art added addition hardware in the form of additional gates (usually extra bits on existing registers).

Figure 4:
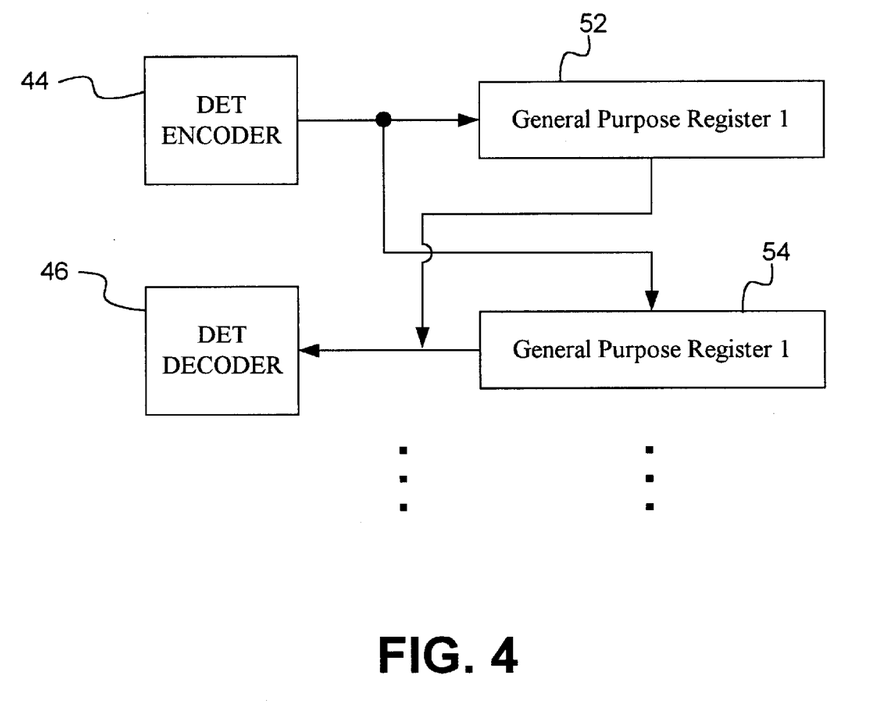
FIG. 4 is a block diagram showing an interconnection between a plurality of general purpose registers and a DET encoder/decoder pair.

Consistent with the inventive concepts, one embodiment may utilize multiple registers to store the various DET values. For example, FIG. 4 illustrates a system like that shown in FIG. 3, wherein the DET encoder 44 and DET decoder 46 may communicate with multiple registers 52, 54 that comprise a portion of the register file 32.

By way of comparison, U.S. Pat. No. 5,748,936, assigned to the assignee of the present invention, provided additional bits in a register file for DETs. That patent discloses on additional bit for each DET. A speculative look aside table (SLAT) is disclosed to store state information used to defer exceptions generated by speculative operations. In contrast, the present invention need not add the additional bits to registers, nor add the SLAT. Instead, the present invention utilizes reserved or otherwise unused values in existing registers to store this information. In the preferred embodiment, the present invention uses the floating point register 152 for this purpose.

Figure 5A:
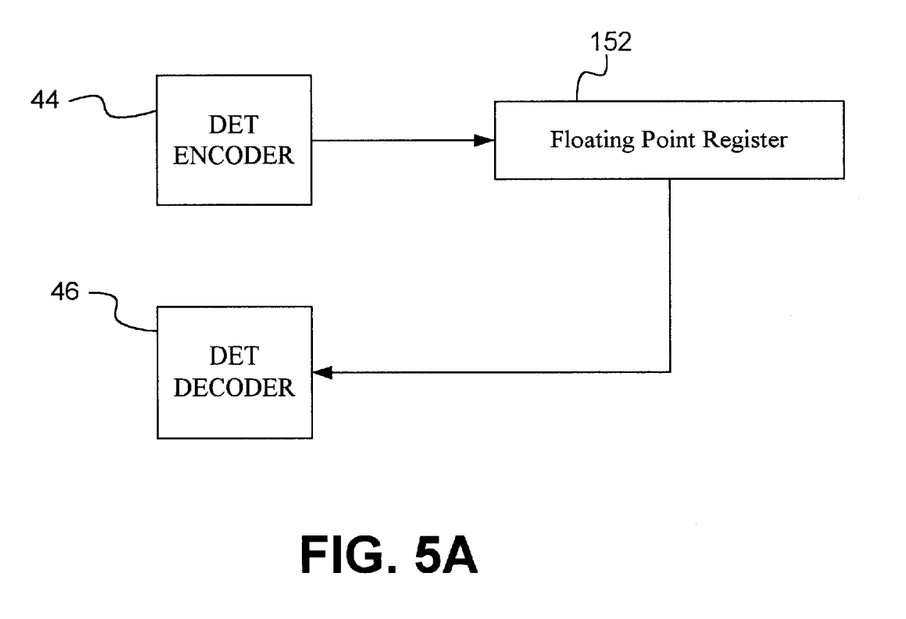
FIG. 5A is a block diagram illustrating the interconnection of a DET encoder/decoder pair with a floating point register of the preferred embodiment.
Figure 5B:
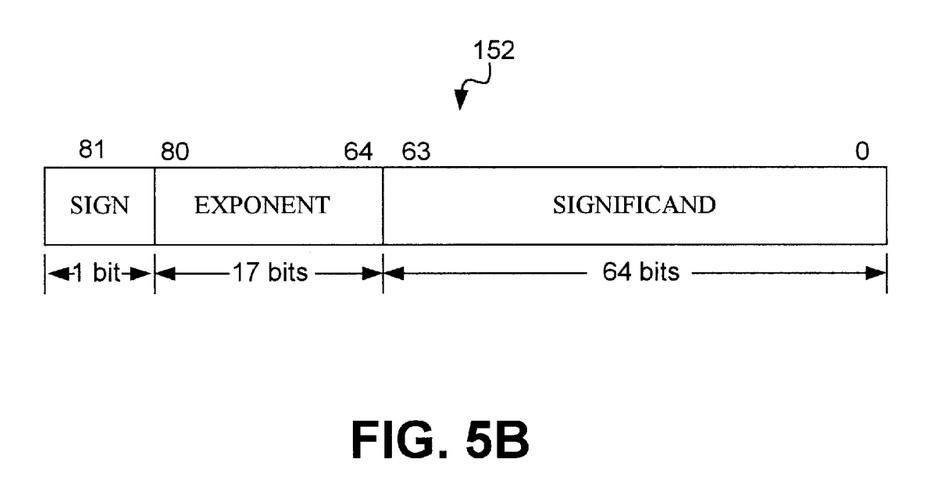
FIG. 5B is a diagram illustrating the bit division of a floating point register of the preferred embodiment.

The floating point register 152 may be in the form illustrated in FIGS. 5A and 5B. Although the bit structure of the floating point register 152 (or other chosen register) may differ among different CPU architectures, the preferred embodiment of the present invention utilizes the structure of FIG. 5B. In this regard, the floating point register 152 is an 82 bit register, having a one bit sign portion, a seventeen bit exponent portion, and a 64 bit significand portion. In the CPU of the preferred embodiment, the seventeen bit exponent portion of the floating point register 152 and the 64 bit significand portion, collectively, were underutilized, in that there were a number of bit sequences that were not utilized. Accordingly, one of these unused sequences was utilized to store a unique DET value.

In many instances, it may be desirable to associate additional information along with the DET value. Consistent with the concepts of the present invention, such additional information may be encoded and stored along with the DET value. Alternatively, is may be separately encoded and associated with the DET value (as by a lookup table). Further still, if, for example, some definable portion of the register (such as the exponent portion) were underutilized, then the remaining portion may be utilized to store an associate value of additional information.

It will be appreciated that the floating point register 152 utilized in the preferred embodiment of the present invention was selected because of the availability of unused bit sequences in that register. However, consistent with the concepts and teachings of the present invention, other registers may be utilized as well. What is significant for purposes of the invention is the utilization of one or more registers within the CPU register file 32 that have available bit sequences that may be encoded with DET values.

Figure 6:
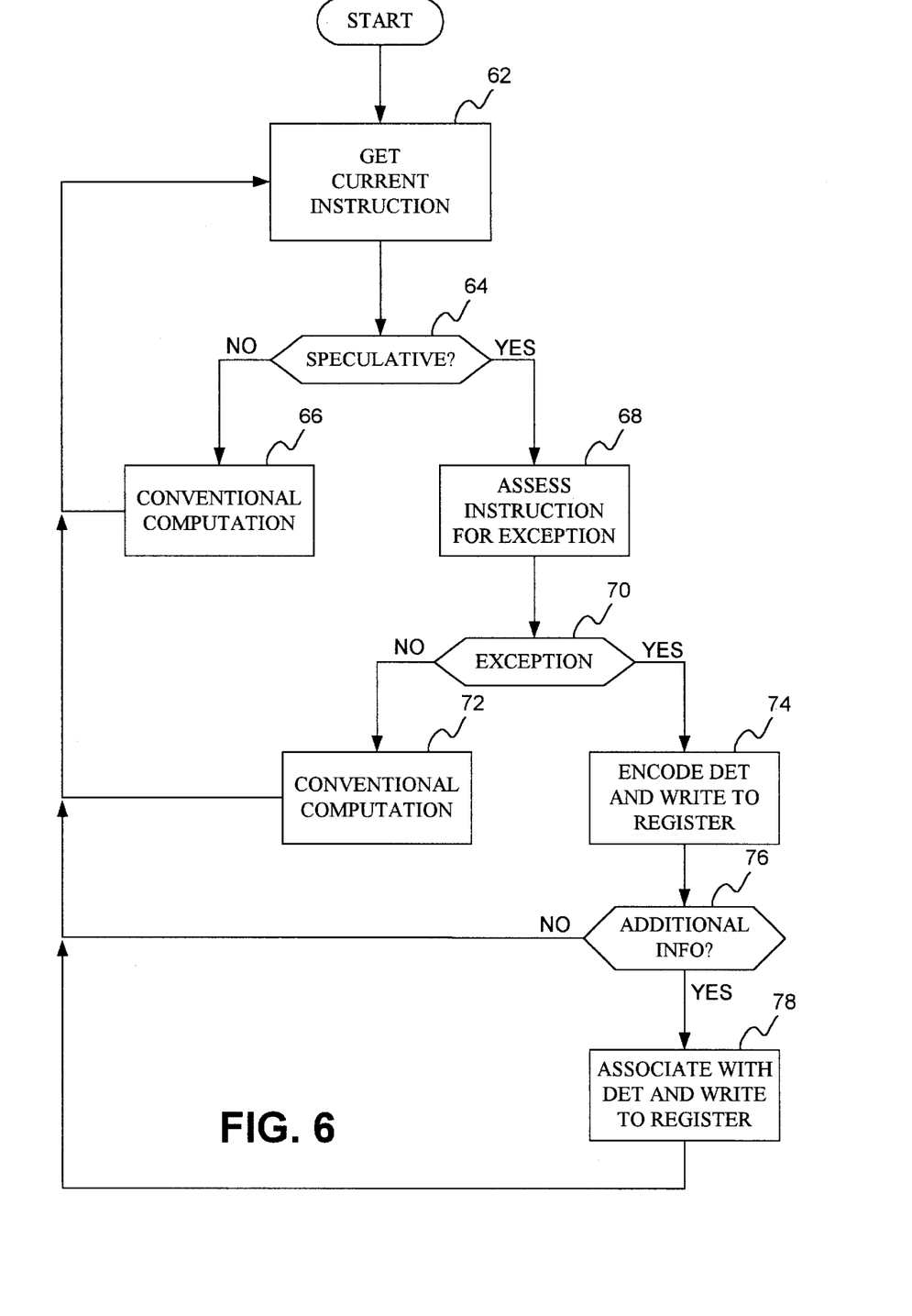
FIG. 6 is a flowchart illustrating the top-level operation of the system according to the present invention.

Reference is now made to FIG. 6, which is a flowchart illustrating the top-level functional operation of a system constructed in accordance with the invention. As illustrated, the operation begins with the system getting an instruction, from the program, for evaluation (step 62). Each instruction is evaluated to determine whether it is a speculative instruction (i.e., outside the current basic block) or not (step 64). If not, then the system will proceed in a conventional fashion (step 66). If, however, the instruction is evaluated to be a speculative instruction, then the system assesses the instruction to determine whether it generates an exception (steps 68 and 70).

If the instruction does not generate an exception, then the system proceeds in a conventional fashion (step 72). If, however, an exception is generated then the system generates a DET to indicate a deferral of the instruction. This DET is then encoded and written into a reserved or otherwise unused bit sequence of an existing CPU register (step 74). Then the system may then determine whether any additional information is to be associated with the DET (step 76). If so, then the additional information is encoded, if necessary, and written into available resister space. In accordance with the preferred embodiment of the present invention, the DET value is written into the floating point register using an otherwise unused bit sequence of the exponent portion and the significand portion of the floating point register 152.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for supporting speculative execution of an instruction set for a central processing unit (CPU) including non-speculative and speculative instructions comprising the steps of:
    evaluating during execution the instructions of the instruction set to determine whether the individual instructions are speculative or non-speculative;
    assessing each of the speculative instructions to determine whether it generates an exception;
    for each of the speculative instructions that generates an exception, encoding a deferred exception token (DET) into an unused register value of a register of the CPU.

2. The method as defined in claim 1, further including the step of encoding additional information associated with the DET value and writing this additional information into the register.

3. The method as defined in claim 1, wherein the register is a floating point register.

4. The method as defined in claim 3, wherein the floating point register includes a plurality of bits for storing exponent information and a plurality of bits for storing significand information.

5. The method as defined in claim 4, wherein the encoded DET value is an unused exponent value and is stored in plurality of bits used for storing exponent information.

6. The method as defined in claim 5, further including the step of encoding additional information associated with the DET value and writing this additional information into plurality of bits for storing significand information.

7. The method as defined in claim 4, wherein the encoded DET value is written into an unused bit sequence that spans both the exponent and significand bits.

8. The method as defined in claim 1, wherein a plurality of registers are used for storing encoded DET values.

9. A system for supporting speculative execution of an instruction set for a central processing unit (CPU) including non-speculative and speculative instructions comprising:
    means for evaluating th e instructions of the instruction set t o determine whether the individual instructions are speculative or non-speculative:
    means for assessing each of the speculative instructions to determine whether it generates an exception;
    means, responsive to the means for accessing, for encoding a deferred exception token (DET) into an unused register value of a register of the CPU.

10. The system as defined in claim 9, further including the means for encoding additional information associated with the DET value and for writing this additional information into the register.

11. The system as defined in claim 9, wherein the register is a floating point register.

12. The system as defined in claim 11, wherein the floating point register includes a plurality of bits for storing exponent information and a plurality of bits for storing significand information.

13. The system as defined in claim 12, wherein the encoded DET value is an unused exponent value and is stored in plurality of bits used for storing exponent information.

14. The system as defined in claim 13, further including means for encoding additional information associated with the DET value and for writing this additional information into plurality of bits for storing significand information.

15. The system as defined in claim 12, wherein the encoded DET value is an unused bit sequence comprising both exponent information and significand information portions of the floating point register.

16. The system as defined in claim 9, wherein a plurality of registers are used for storing encoded DET values.

17. The system as defined in claim 9, wherein the means for encoding includes an electronic circuit in electrical communication with the register.

* * * * *